(12) United States Patent
Taylor-Smith (10) Patent No.: US 6,313,219 B1
(45) Date of Patent: *Nov. 6, 2001

(54) METHOD FOR HYBRID INORGANIC/ORGANIC COMPOSITE MATERIALS

(75) Inventor: Ralph E. Taylor-Smith, Dunnellen, NJ (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/087,522

(22) Filed: May 29, 1998

Related U.S. Application Data

(63) Continuation-in-part of application No. 08/911,489, filed on Aug. 14, 1997, now Pat. No. 5,965,202, which is a continuation-in-part of application No. 08/641,856, filed on May 2, 1996, now Pat. No. 5,739,180.

(51) Int. Cl.[7] ...................................................... C08L 43/00
(52) U.S. Cl. ......................... 524/853; 523/202; 523/203; 523/216; 525/474; 525/479
(58) Field of Search .................... 523/202, 203, 523/216; 524/853; 525/474, 479

(56) References Cited

U.S. PATENT DOCUMENTS

| 5,116,703 | 5/1992 | Badesha et al. . |
| 5,231,156 | 7/1993 | Lin . |
| 5,384,376 | 1/1995 | Tunney et al. . |
| 5,412,043 | 5/1995 | Novak et al. . |
| 5,514,734 | * 5/1996 | Maxfield et al. ..................... 523/204 |
| 5,527,871 | 6/1996 | Tani et al. . |

* cited by examiner

Primary Examiner—Blaine Copenheaver
Assistant Examiner—Christopher Paulraj
(74) Attorney, Agent, or Firm—DeMont & Breyer, LLC; Wayne S. Breyer; Jason Paul DeMont (57) ABSTRACT

The present invention provides a systematic method for "engineering" hybrid inorganic/organic compounds (IOCs) to exhibit specific physico-chemical properties as may be desired for a particular materials application. Such hybrid inorganic/organic compounds comprise, in some embodiments, an organic phase in the form of a polymer matrix and an inorganic phase that is chemically linked thereto. In one embodiment of the method, given a specific application, (i) desired physico-chemical properties to be possessed by the hybrid IOC are defined; (ii) candidate inorganic and organic phases are selected; (iii) the morphology of those phases is controlled via "microstructural engineering" such that the phases collectively exhibit the physico-chemical properties required of the hybrid IOC; and (iv) the morphology of the hybrid IOC is controlled via "macrostructural engineering" such that the physico-chemical collectively possessed by the phases are exhibited by the hybrid IOC.

20 Claims, 4 Drawing Sheets

METHOD FOR HYBRID INORGANIC/ORGANIC COMPOSITE MATERIALS

STATEMENT OF RELATED CASES

This application is a continuation-in-part of application Ser. No. 08/911,489, filed Aug. 14, 1997 U.S. Pat. No. 5,965,202, which is a continuation-in-part of application Ser. No. 09/641, 1956, filed on May 2, 1996 U.S. Pat. No. 5,739,180.

FIELD OF THE INVENTION

The present invention relates generally to hybrid materials systems. More particularly, the present invention relates to a process for engineering hybrid inorganic/organic composite materials utilizing a modular approach.

BACKGROUND OF THE INVENTION

A demand exists for materials having unique physico-chemical properties. Such a demand stems, in part, from a desire to find replacements for mainstay materials such as conventional glass, etc. While possessing the desired properties of the mainstay material, such replacements would ideally be cheaper and simpler to produce (e.g., milder processing conditions, etc.), and lighter yet more mechanically robust than the materials they replace.

One class of materials having such unique physico-chemical properties are hybrid inorganic/organic composites (IOCs). Hybrid IOCs comprise an organic phase and an inorganic phase that are chemically linked together. Such hybrids possess, in varying degrees, properties of both phases. The properties ultimately exhibited by the hybrid IOC are determined by a number of factors. Such factors include, for example, the identity and concentration of the inorganic and organic phases comprising the hybrid, the morphology (i.e., microstructure) of each of the inorganic and the organic phases, the morphology of the resulting hybrid, and the structure of a coupling agent advantageously used to chemically link the inorganic and organic phases to one another.

It will be appreciated that the particular mix of physico-chemical properties required of a hybrid IOC will vary with its intended use. For example, in some applications, the optical and thermal properties of a hybrid IOC are of particular importance, while in other applications, the dielectric and thermal properties are important but optical properties are inconsequential. As there have been relatively few controlled studies of hybrid inorganic/organic materials, little systematic guidance or methodology is available for selecting and synthesizing a hybrid IOC that possesses specific properties for use in a particular application.

In view of the above, the art would benefit from a method by which hybrid IOCs can be "engineered" for use in a particular application.

SUMMARY OF THE INVENTION

The present invention provides a systematic method for "engineering" hybrid inorganic/organic compounds (IOCs) to bit specific physico-chemical properties as may be desired for a particular materials application. Such hybrid inorganic/organic compounds comprise, in some embodiments, an organic phase in the form of a polymer matrix and an inorganic phase that is chemically linked thereto. The inorganic phase and the organic phase are generated from respective inorganic phase and organic phase precursors. Linking of the inorganic and organic phases is advantageously promoted via the use of a coupling agent.

A method in accordance with the present teachings advantageously applies a structured, "modular" approach to synthesizing, hybrid IOCs. In one embodiment, given a specific application, (i) desired physico-chemical properties to be possessed by the hybrid IOC are defined; (ii) candidate inorganic and organic phases are selected; (iii) the morphology of those phases is controlled via "microstructural engineering" such that the phases collectively bit the physico-chemical properties required of the hybrid IOC; and (iv) the morphology of the hybrid IOC is controlled via "macro-structural engineering" such that the physico-chemical properties collectively possessed by the phases are exhibited by the hybrid IOC.

As more and more hybrid IOCs are engineered by a method in accordance with the present teachings, a library or catalogue of "modules" is advantageously amassed. Each of such modules defines a composition and morphology for one of the constituent elements (i.e., the inorganic phase, the organic phase or the coupling agent) to obtain a specific set of physico-chemical properties. Presented with a new application for a hybrid IOC, modules can be suitably selected from the library, as a function of the desired physico-chemical properties, to synthesize a hybrid IOC appropriate for the application.

In one illustrative embodiment, the present methods are applied to synthesizing hybrid IOCs suitable for replacing conventional glass in a variety of specific applications.

BRIEF DESCRIPTION OF THE DRAWINGS

FIG. 2a depicts, figuratively, a portion of a hybrid IOC wherein the inorganic component of FIG. 1a is linked to an organic component via the coupling agent of FIG. 1a.

DETAILED DESCRIPTION

The phrases "inorganic component," "inorganic phase" and "inorganic particles" are used interchangably throughout this specification. Similarly, the phrases "organic phase," "organic component" and "organic matrix" are used interchangably. The terms "phase," "component" or particles" will be used to refer to both the component and its "precursor" unless otherwise noted.

For clarity of presentation, an overview of hybrid IOC chemistry is provided below in SECTION I before a method in accordance with an illustrative embodiment of the present invention is described in SECTION II.

SECTION I

A hybrid IOC comprises an organic phase linked to an inorganic phase. Such linking is accomplished, in some embodiments, using an inorganic component or a precursor thereof, that has an organic functionality OF. The organic functionality OF preferentially interacts with the organic component thereby forming a link between the inorganic and organic components.

Figure 1A:
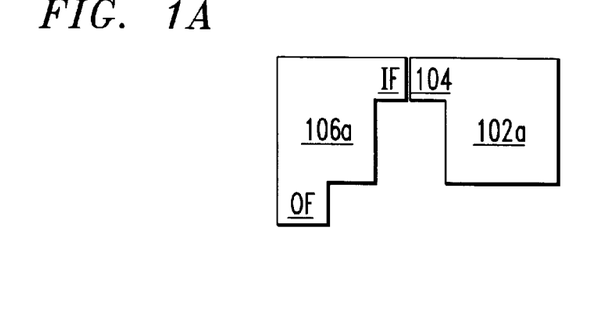
FIG. 1a depicts, figuratively, a link between an inorganic component and a coupling agent.
Figure 1B:
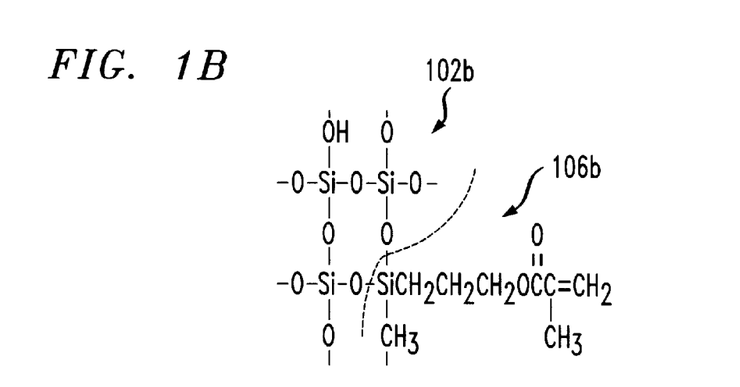
FIG. 1b, depicts an inorganic phase comprising poly (silicic acid) linked to a coupling agent comprising methacryloxypropylmethyldimethoxysilane.

The inorganic component containing the organic functionality OF is prepared, in a first embodiment, by linking a coupling agent possessing both the organic functionality OF and an inorganic functionality IF to the inorganic component. Such a link is illustrated figuratively in FIG. 1a, wherein inorganic functionality IF of a coupling agent 106a preferentially interacts with a functional group or groups 104 present in inorganic component 102a. Such interaction is believed to be a covalent bond-forming reaction. FIG. 1b depicts a coupling agent 106b, methacryloxypropylmethyldimethoxysilane, linked to a portion of an inorganic phase 102b, poly(silicic acid).

Figure 2A:
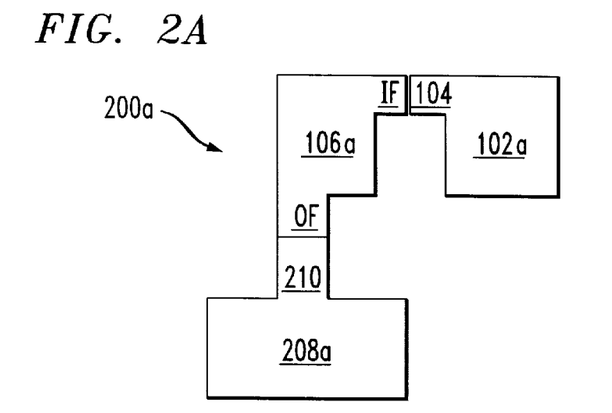
Figure 2B:
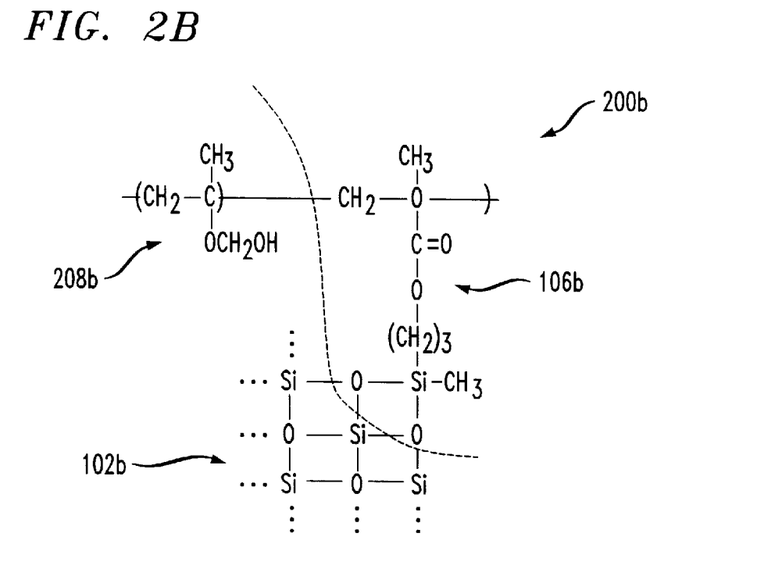
FIG. 2b depicts a portion of a hybrid IOC wherein an organic phase comprising poly(hydroxyethylmethacrylate) is linked to the inorganic phase and coupling agent of FIG. 1b.

A portion 200a of an illustrative hybrid IOC comprising an organic component 208a linked to the inorganic component 102a via coupling agent 106a is figuratively depicted in FIG. 2a. Organic functionality OF from the linked inorganic component/coupling agent preferentially interacts with a functional group or groups 210 of organic component 208a. Such preferential interaction is again believed to be a covalent bond-forming reaction. In some embodiments, one of the phases forms a "dominant phase" or matrix in which the other phase is dispersed. In other embodiments, the phases are bi-continuous wherein neither is appropriately termed "dominant." In many applications, the inorganic phase is dispersed within the organic phase, which is typically a polymer. FIG. 2b depicts a portion 200b of an illustrative hybrid IOC, wherein inorganic phase 102b (poly (silicic acid)), is linked, via coupling agent 106b (methacryloxypropylmethyldimethoxysilane,) to organic phase 208b (poly(hydroxyethylmethacrylate)).

The inorganic component is generated, typically via oligomerization, from a precursor component that has an inorganic constituent but which may not be purely "inorganic." That is, the inorganic component precursor may include an organic constituent, as well. Though only figuratively accurate, it is convenient to refer to the inorganic component as a collection of "particles." The inorganic particles are perhaps best described as regions of relatively uniform density that are rich in the inorganic component. The organic component is generated, typically via polymerization, from an organic-component precursor.

SECTION II

In accordance with the present teachings, a hybrid IOC is "engineered" to possess a predetermined set of physico-chemical properties. Such properties are "donated," in varying degrees, by the constituent inorganic and organic phases. For example, such hybrids may be engineered to possess relatively high thermal stability, characteristic of certain inorganic compounds (e.g., silica) but not of organic compounds, and also be relatively lightweight and substantially mechanically impervious to impact stresses, characteristic of certain organic compounds (e.g., plastics) but not of silica.

The properties ultimately exhibited by a hybrid IOC are determined by a number of factors. Such factors include, for example, the identity, and concentration of the inorganic and organic components comprising the hybrid, the morphology (i.e., microstructure) of those components, the morphology of the resulting hybrid, and the structure of the coupling agent. By controlling such factors, a hybrid IOC can be engineered to possess a desired set of physico-chemical properties/attributes for a specific application.

Figure 3:
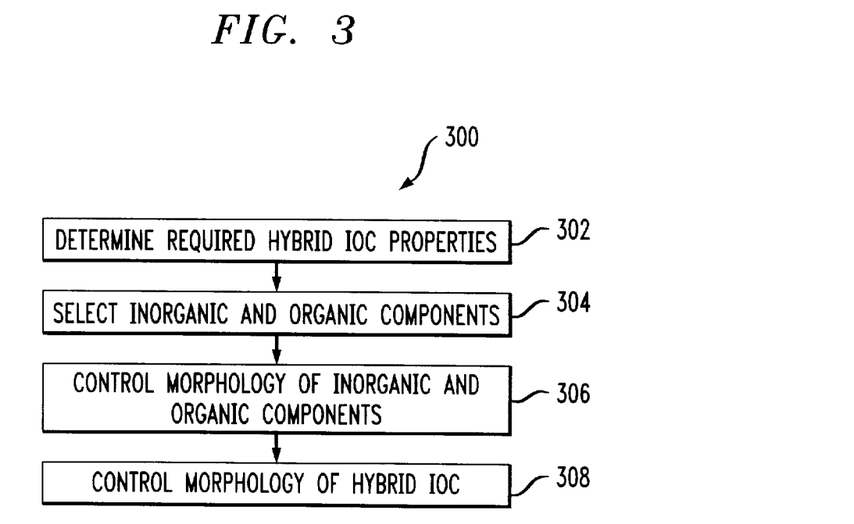
FIG. 3 depicts a flow diagram of a method for engineering application-specific hybrid IOCs in accordance with an illustrative embodiment of the present invention.

FIG. 3 depicts a block flow diagram of a method 300 for engineering application-specific hybrid IOCs in accordance with an illustrative embodiment of the present invention. In a first operation 302 the physico-chemical properties that the hybrid IOC must possess for the specific application are defined. Such physico-chemical properties may be dictated, in part, by the processing requirements of other materials used with the hybrid IOC in the specific application. For example, in one application, the hybrid IOC may be used for the fabrication of integrated-circuits. Integrated-circuit manufacture requires exposing semiconductors to particular processing environments (e.g., chemical etches, etc.) and conditions (e.g., temperatures greater than 450° C., etc.). To the extent that the hybrid IOC is present during such processing steps, it must be able to maintain its integrity in such environments under such conditions. In such a case, processing conditions thus define some of the physico-chemical properties required for the hybrid IOC. See applicant's U.S. Pat. No. 5,965,202 issued Oct. 12, 1999 entitled for "Hybrid Inorganic-Organic Composite for Use as an Interlayer Dielectric."

Moreover, the intended use or function of the hybrid IOC in a specific application may dictate some of its physico-chemical properties. For example, if used as a replacement for a glass display, then the optical properties of the hybrid IOC (e.g., freedom from birefringence, transparency, etc.) may be important. See applicant's U.S. Pat. No. 5,739,180 issued Apr. 14, 1998 entitled "Flat-Panel Displays and Methods and Substrates Therefor," incorporated by reference herein.

Once the required physico-chemical properties are defined, the inorganic and organic components from which the hybrid IOC is formed are selected, as per operation 304. Some of the physico-chemical properties required of the hybrid IOC are donated by the inorganic phase, and other of such properties are donated by the organic phase. There are certain properties generally associated with each constituent phase. Properties characteristic of the inorganic phase includes, in varying measure: thermoresistance, permeation resistance and chemical resistance. Properties characteristic of the organic phase, which is typically polymeric, include, in varying measure: low density, impact resistance, toughness, elastomeric properties, and the like.

Beyond such generalizations, those skilled in the art can suitably select specific inorganic and organic compounds that collectively possess the properties defined in operation 302 by consulting reference texts. For example, for organic polymeric compounds, reference texts such as Brandup and Immerguts' *Polymer Handbook*, (John Wiley & Son, 3rd ed., 1989) and Ku and Liepins' *Electrical Properties of Polymers*, (Hanser Publishers, 1987) provide the required information concerning physico-chemical properties, and for inorganic components, texts such as Greenwood et al., *Spectroscopic Properties of Inorganic & Organometallic Compounds*, Vol. 1–9, (The Chemical Soc'y, London, 1968) and Barin, *Thermochemical Properties of Inorganic Substances*, (Springer Publishers, 1973) may suitably be used.

In many embodiments, reliance is placed on the inorganic phase to supplement a desired property possessed, to a lesser extent, by the organic phase—for example, thermal stability. In such embodiments, it is particularly advantageous to select an organic-phase precursor (e.g., monomer, etc.) that is known to produce a polymer biting the desired physico-chemical properties in greater rather than lesser measure. By so doing, the amount of inorganic component needed for supplementation is reduced. Such a reduction is advantageous since the inorganic component may contribute undesirable properties to the hybrid IOC, such as, for example, increased weight or increased dielectric attributes. As previously noted, a reference text may be consulted to select a polymer biting the desired properties.

For example, if thermal stability is required, preferred precursors include, without limitation, those that form ring-containing polymers, either aliphatic or aromatic rings, such as aromatic polyimides. Aromatic polyimides can be synthesized, as is well known, by the reactions of dianhydrides with diamines or diiusocyanates. See, Odian, *Principles of Polyimerization*, (John Wiley & Sons, 3d. ed.).

While component selection, operation 304, is important in determining physico-chemical properties of the hybrid IOC, so is the morphology (i. e., the microstructure) of each phase. In accordance with operation 306, the morphology of each phase is separately controlled to obtain the desired properties. Morphology control, in accordance with the present teachings, will be described in the context of a more general discussion concerning the nature of the inorganic and organic precursors and the inorganic and organic components used to form a hybrid IOC.

As previously noted, in some embodiments, the inorganic component used for forming the hybrid IOC is synthesized from an inorganic-component precursor, typically a metal alkoxide. Metal alkoxide can be represented by the formula $M(OR)_4$:

[1]

where: —OR is an alkoxide group, which can be individually selected, and M is a metal, such as silicon (Si), germanium (Ge), titanium (Ti), zirconium (Zr) or tin (Sn).

Several non-limiting examples of such metal alkoxides include tetraethyl orthosilicate (TEOS), tetramethyl orthosilicate (TMOS), zirconium (IV) butoxide and zirconium (IV) propoxide. There are no per se limitations on the size of alkyl group R. As the size of R increases, however, the rate at which the inorganic component is formed via loss of the —OR groups decreases. As a practical matter, smaller-sized alkyl groups are preferred. Metal alkoxides suitable for use in conjunction with the present invention can be purchased from a manufacturer, such as Gelest, Inc., of Tullytown, Pa. Alternatively, the metal alkoxide can be synthesized according to well known methods.

In other embodiments, modified-metal alkoxides can be used as a precursors. In such modified-metal alkoxides, less than all, and preferably one, of the —OR groups of the metal alkoxide are replaced by an —$R^1$ group, i.e., $R^1{}_nM(OR)_{4-n}$. During synthesis of the inorganic component, alkoxide groups, i.e., —OR, are driven off as volatile byproduct that is not retained in the final inorganic component. The substituted group, i.e., the —$R^1$ group, however, is retained in the final inorganic component. The —$R^1$ group is an organic group, i.e., carbon containing, that may be polymerizable or non-polymerizable. Methyltriethoxysilane (MTEOS), where the —$R^1$ group is a methyl group (—$CH_3$), is an example of such a modified alkoxide. Note that even though the reaction product from the modified-metal alkoxide $R^1{}_nM(OR)_{4-n}$ is not properly categorized as "inorganic," the sol-gel reaction product with the retained —$R^1$ will still be referred to as the inorganic component, etc. See Brinker et al., *Sol-Gel Science: The Physics and Chemistry of Sol-Gel Processing*, p. 115, (Academic Press, Calif. 1990).

Replacing one of the —OR groups with an —$R^1$ group in modified-metal alkoxides, as described above, is a first way to control morphology and "engineer" properties into the inorganic phase, and, ultimately, the hybrid IOC. For example, it is known that the fluorine reduces the dielectric constant of materials systems. If it is desirable for a hybrid IOC to have a relatively low dielectric constant, one or more of the —OR groups of the metal alkoxide may advantageously be replaced with a fluorine-containing —$R^1$ group. One example of a compound resulting from such substitution is (tridecafluoro-1,1,2,2-tetra-hydrooctyl)triethoxy-silane:

Such fluorine-containing metal alkoxides are available from Gelest, Inc., of Tullytown, Pa.

The inorganic component is generated in-situ from the inorganic component precursor via controlled nucleation and growth methods. The inorganic component is formed in two steps that occur substantially simultaneously after initialization. The first step is monomer formation via partial hydrolysis of the inorganic component precursor, which is typically the metal or modified-metal alkoxide, e.g.:

[2]

Solvent and catalyst can be used to promote the reaction. The second step is polycondensation of the monomers to form colloid-like oligomers:

[3]

Thus, the inorganic particles "grow" via a controlled polymerization. As previously noted, such "particles" are perhaps best described as regions of relatively uniform density that are rich in the inorganic component. The polymerization can be controlled to yield particles having a specific molecular weight, i.e., size. The particles forming the colloid are, on average, nanometer (nm)-sized. That is, the particles have an average particle size of less than a micron in diameter. The formation of such nanometer-sized in-situ-generated inorganic particles is well known in the art. See, for example, Yoshida, A., "Silica Nucleation, Polymerization and Growth Preparation of Mono-Disperse Sols," in *The Colloidal Chemistry of Silica*, Bergna H. E., ed., Adv. Chem. Ser. 234; ACS, Wash D.C. (1990) Gelest Catalog for Silicon. Germanium, Tin and Lead Compounds, Metal Alkoxides, Diketonates and Carboxylates, pp. 279–283

(1995). Those skilled in the art will recognize that the chemistry described above applies well known sol-gel techniques.

Figure 4:
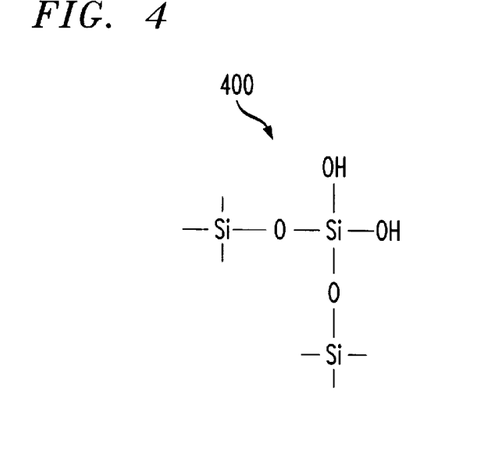
FIG. 4 depicts silicic acid with $Q^2$ structure.
Figure 5:
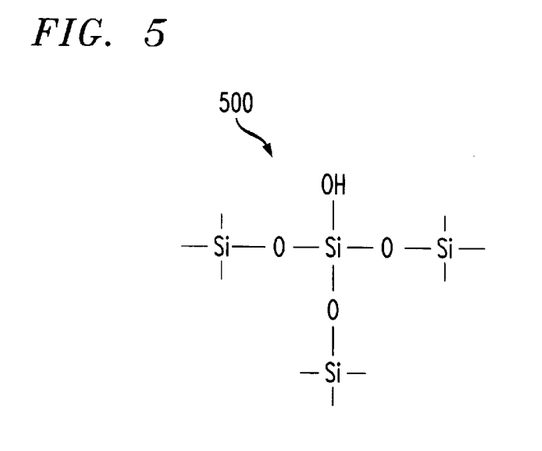
FIG. 5 depicts silicic acid with $Q^3$ structure.
Figure 6:
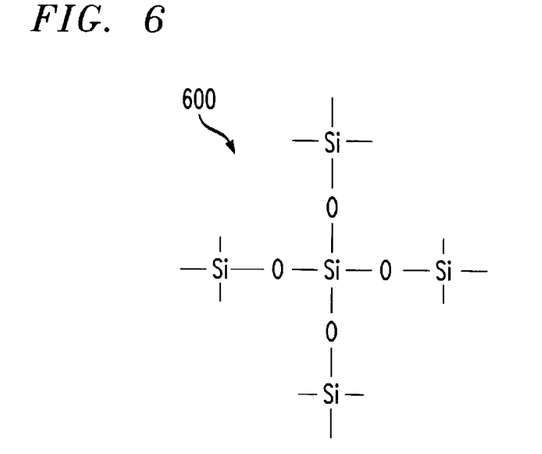
FIG. 6 depicts silicic acid with $Q^4$ structure.

It has been determined that the degree of condensation of the metal M in the inorganic phase affects the physico-chemical properties of a hybrid IOC. FIGS. 4–6 show. respectively, a portion 400, 500 and 600 of a silicon-based inorganic component, wherein the degree of condensation of the silicon increases in succeeding Figures. In FIG. 4, inorganic 400 has two —OH groups and two —OSi—groups (siloxane) attached to the silicon atom. The inorganic 400 is referred to herein as having "$Q^2$" structure. Inorganic 500 depicted in FIG. 5 is more condensed than inorganic 400. Inorganic 500 has "$Q^3$" structure wherein only one —OH group and three —OSi—groups are attached to the silicon. FIG. 6 depicts inorganic 600 having a "$Q^4$" structure with four —OSi—groups and no —O(H groups. The "Q" notation refers to a shift in NMR spectra peak location for a given atom due to other atoms its vicinity. Thus, in FIGS. 4–6, the "Q" value is indicative of the number of siloxane groups attached to a given silicon atom. More generally, the "Q" value is indicative of the number of —OM—groups attached to a given metal atom.

Figure 7:
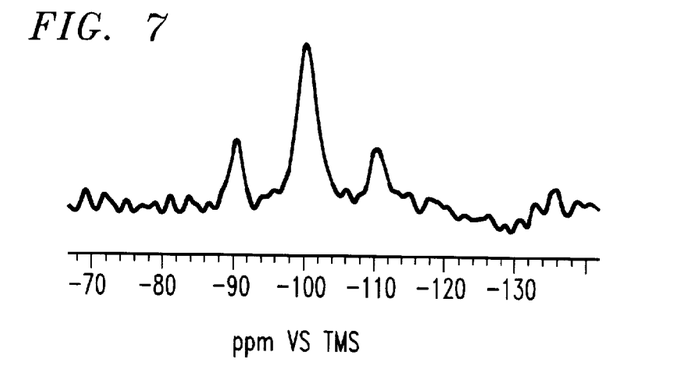
FIG. 7 depicts a NMR spectra of poly(silicic acid).

The inorganic phase is not 100 percent $Q^2$, $Q^3$ or $Q^4$, but rather a mixture of all three. FIG. 7 depicts an illustrative silicon NMR for a silicic acid solution formed from sodium metasilicate (shown below):

[4]

In embodiments wherein silicon NMR shows a relatively larger proportion of $Q^2$ and a relatively smaller portion of $Q^4$, the inorganic phase has a proportionately large quantity of SiOH (silanol units) located throughout. Such a large proportion of silanols is consistent with a diffuse morphology (i.e., a porous inorganic particle, to continue the particle metaphor). A particle having a relatively greater proportion of $Q^4$ than $Q^2$ has a proportionately low quantity of silanol units. Such a proportionality is consistent with a dense "particle" morphology.

The ratio of $Q^2$ to $Q^3$ to $Q^4$, which is controllable, is thus indicative of the "porosity" of the inorganic "particle." The porosity of the particle can affect the degree to which the inorganic and organic phases can intermix, with the potential for intermixing increasing with increasing porosity. The degree of intermixing (i.e., inorganic-organic interpenetration) affects both thermal and mechanical properties of the hybrid IOC. In general, an inorganic minority phase having a relatively high porosity results in a hybrid IOC that thermally decomposes at a relatively high onset temperature. Moreover, a relatively more porous inorganic particle produces a hybrid IOC having a generally higher modulus, lower elasticity and higher impact strength than less porous inorganic particles.

In some embodiments, the degree of condensation of silicon is controlled by controlling the pH of reactions [2] and [3] above. In particular, carrying out the reaction in an acidic environment (e.g., 3.6 M hydrochloric acid, etc.) promotes a distribution biased towards $Q^2$ and $Q^3$. The NMR depicted in FIG. 7 is for a silicic acid solution formed from sodium metasilicate with 3.6M HCL as a catalyst. On the other hand, when the pH is basic, the distribution is baised towards $Q^4$.

The average particle size of the inorganic phase also affects the physico-chemical properties of a hybrid IOC. In particular, particle size affects optical properties, such as transparency, and may impact mechanical properties. In particular, if average particle size is less than about 400 nm, then visible light will not be scattered. Regarding mechanical properties, a smaller average particle size generally results in improved mechanical properties. Moreover, if the inorganic phase comprises semiconductor material (e.g., lead selenide, cadmium selenide, gallium arsenide, etc.), particle size and particle size distribution is important for obtaining quantum confinement.

Figure 8:
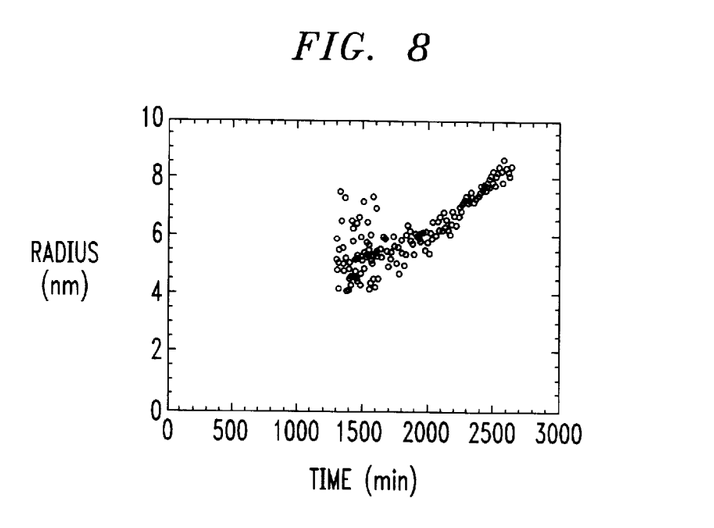
FIG. 8 depicts a plot of average particle size versus reaction time.

It has been discovered that a substantially linear relationship exists between average particle size and reaction time for particle synthesis via the sol-gel reactions previously described. FIG. 8 depicts a plot of average particle radius as a function of reaction time for the growth of poly(silicic acid) from sodium metasilicate. Particle size is obtain using dynamic light scattering measurements and applying a "hard sphere" model to the results. It will be appreciated that the size/reaction time relation will vary for different inorganic components and the conditions under which they are grown. Those skilled in the art can readily determine a size/reaction time relation by simple experimentation for a selected inorganic component.

In other embodiments, a suspension of preformed nanometer-sized (average) inorganic particles can be used as an alternative to generating the inorganic particles in-situ as described above. Using such preformed particles may be disadvantageous since particle agglomeration may result. Such agglomeration may lead to poor mechanical properties if the size-scale of heterogeneity is sufficiently high.

With regard to the organic phase, morphology is dependent, in large part, on component selection. Such dependence is particularly pronounced in multi-component systems, such as a block copolymer or polymer blends. The polymers comprising such systems may exhibit lamellar, spherical or cylindrical geometries as a function of composition. Each of such geometries may be associated, generally, with different properties. For example, the anisostropic orientation of lamellar-structured systems could lead to enhanced mechanical properties, permeation resistance, etc., as compared with a spherical geometry.

There are a variety, of known methods for controlling polymer properties, which methods can be utilized in conjunction with the present invention. For example. if a polymers glass transition temperature is substantially (i.e., >20° C.) below the ambient or use temperature, it can be made to bit elastic properties associated with typical rubbers by introducing a network of primary chemical-bond crosslinks after polymerization (vulcanization). Continued primary-bond crosslinking during vulcanization converts rubbery material into hard rubber. Crosslinking concurrent with polymerization produces thermosetting materials.

As the temperature of a polymer melt or rubber is lowered, the glass-transition temperature is reached, at which point the polymeric materials undergo a change in properties. Below their glass-transition temperature, amorphous polymers bit properties associated with ordinary inorganic glasses, such as hardness, stiffness, and brittleness.

Some polymers can crystallize at temperatures below their crystalline melting point. Crystalline polymers are generally quite robust, stiff and are highly resistance to attack by chemicals. By increasing intermolecular forces through, for example, the selection of highly polar polymers, and by using inherently stiff polymer chains, crystalline melting points can be raised so that mechanical properties associated with such crystallinity can be retained at relatively high temperatures. Such plastics, and hybrid IOCs incorporating same, are particularly suitable for replacing metals and ceramics. Moreover, the properties of crystalline polymers can be improved for materials in fiber form by drawing or orientation processes. The result of such processes include increased strength, stiffness and dimensional stability assoicated with synthetic fibers. For further description of the interrelation between polymer structure/morphology and polymer properties, see Billmeyer, *Textbook of Polymer Science*, Chaps. 1& 12 (John Wiley & Sons, 3rd. ed., 1984).

In some embodiments, the organic component-forming polymerization reaction is initiated by a free-radical initiator. In a further embodiment, an organic phase cross-linking agent is added to promote cross-linking as described above. The free-radical initiator and the cross linker are selected based on the organic precursor being used. Such selection is within the capabilities of those skilled in the art. Free-radical initiator and cross linker requirements based on organic precursor feed is in the range of from about 1 to about 5 weight percent.

Thus, the morphology of each phase is controlled such that each phase possesses the desired properties. With reference to FIG. 3, step 308, and in accordance the present teachings, the morphology of the hybrid IOC (i.e., the arrangement of the two phases) is controlled so that the properties exhibited by each phase are possessed, in the desired measure, by the hybrid IOC. The morphology of the hybrid IOC is controlled, in large part, by the coupling agent. The manner in which a coupling agent is used to control morphology, in accordance with the present teachings, is described below in the context of a more general discussion concerning the nature of the coupling agent.

It has been stated herein that the interaction between (i) the organic functionalities OF of coupling agent 106*a* with group 210 of organic component 208*a* and (ii) the interaction between inorganic functionality IF of the coupling agent with group 104 of inorganic component 102*a* are believed to be covalent bond-forming reactions. (FIGS. 1*a* and 2*a*) On this basis, those skilled in the art will be able to select a suitable coupling agent based on the inorganic and organic components being used.

For example, if the organic component precursor is a polyimide precursor and the inorganic component precursor is (tridecafluoro-1,1,2,2-tetra-hydrooctyl)triethoxysilane, a suitable coupling agent contains a primary-amine functionality (e.g. R-NH$_2$) and Si—O—R groups. The amine functional group reacts with the polyimide precursor forming a polyamic acid-amide linkage before imidization of the precursor. The Si—O—R groups, where R is any non-polymerizable alkyl group, such as, without limitation, a methyl or an ethyl group, react with the silanol (Si—O—H) groups resulting from (tridecafluoro-1,1,2,2-tetra-hydrooctyl)triethoxysilane hydrolysis. Preferably, the coupling agent contains at least two —OR groups bound to a single metal atom (e.g., silicon for the above example). Given the above organic and inorganic components, suitable exemplary coupling agents include, without limitation, 3-aminopropyltriethoxysilane, 3-aminopropyltrimethoxysilane, 3-aminopropyltris(methoxyethoxy-ethoxy)silane, 3-aminopropyltris(trimethylsiloxy)-silane.

The coupling agent increases inter-component adhesion by acting as a "bridge" that links the two phases. More accurately, the coupling agent forms links with each of the phases thereby indirectly linking them. The coupling agent decreases surface energy of the phases thereby enchancing mixing thereof. In the absence of a coupling agent, the inorganic and organic phases may associate, especially in solution and in the presence of certain solvents. Such associations are, however, metastable. The coupling agent stabilizes the morphology by forming covalent bonds across the inorganic/organic interphase.

Moreover, the coupling agent enhances mechanical properties of the hybrid IOC by facilitating interphase stress transfer. The coupling agent also reduces inorganic-phase agglomeration and phase separation. Furthermore, it has been observed that the coupling agent can result in enhanced thermal resistance.

As the foregoing description indicates, simply selecting a coupling agent suitable for forming covalent bonds to the selected inorganic and organic phases provides a measure of morphology control for the hybrid IOC. Additional control over hybrid IOC morphology and hence hybrid IOC properties, is provided via the functionality of the coupling agent. In particular, the above-listed illustrative coupling agents have only a single primary amine group, and will function as a chain terminator, limiting the chain length of the organic component grafted onto the inorganic component. In other embodiments, "bi-functional" coupling agents having two primary amine groups are advantageously used. Such bi-functional coupling agents act as a chain extender for the organic polymer. Relative to shorter-chained polymers, such longer-chained polymers typically result in a hybrid IOC exhibiting greater mechanical robustness, less brittleness and greater impact strength. Coupling agents having two such primary amine groups, however, are not readily commercially available. Such coupling agents can, however, be synthesized. See, for example, Morikawa et al., "Preparation of New Polyimide-Silica Hybrid Materials via the Sol-Gel Process," J. Mater. Chem., V.2, no. 7, pp. 679–90 (1992). One example of a class of bi-functional coupling agents include ethoxy silated diamines, such as:

It will be appreciated by those skilled in the art that the R group of the inorganic functionality IF of the coupling agent (e.g., OC$_2$H$_3$ for the bi-functional compound shown above) will affect the rate and extent of the reaction between the coupling agent and the inorganic component. In some embodiments, the coupling agent and the inorganic compound contain the same metal. Coupling agents can be obtained from manufacturers such as Gelest, Inc. of Tullytown, Pa. See. for example, Gelest Catalog for Silicon, Germanium Tin and Lead Compounds, Metal Alkoxides, Diketonates and Carboxylates, pp. 41–52 (1995).

The coupling agent should be added to the inorganic component in an amount sufficient to bond to some portion of accessible M—O—H groups of the inorganic particles. The amount of accessible M—O—H groups is estimated by calculating a total number of surface M—O—H groups based on average particle size. A theoretical coupling agent requirement is then estimated based on the number of such surface M—O—H groups. An excess of two to three times the theoretical requirement may suitably be added to the inorganic component.

It should be appreciated that the theoretical coupling agent requirement may vary with the particular inorganic compound selected and its concentration. Coupling agent requirements are best determined, however, by routine experimentation. A figure of about 0.3 has been found to be satisfactory, for the molar ratio of (the coupling agent) (the metal in the inorganic-compound precursor) for the system described in the Example later in this specification. It is expected, however, that lesser amounts of coupling agent may suitably be used. For example, it is believed that bonding a minor portion (i.e., less than 50 percent) of accessible M—O—H groups is acceptable if the minor portion is well distributed about the "perimeter" of the particle.

In certain embodiments, the coupling agent oligomerizes. Conditions are selected to reduce oligomerization to promote efficient use of materials. For example, reducing coupling agent concentration reduces oligomerization. Such conditions are known to those skilled in the art. See Keefer, K. D., in *Silicon-Based Polymer Science*, ACS Symp. Ser., v. 224 (1990).

Figure 9:
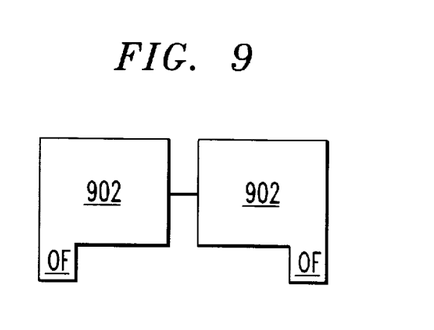
FIG. 9 depicts a figuratively, two coupling agents linking.

It will be appreciated by those skilled in the art that tile aforementioned coupling agents are modified-metal alkoxides having at least one —$R^1$ group that can participate in organic polymerization reactions. As previously described, such modified-metal alkoxides are also suitable for forming the inorganic component. Hence, in some embodiments, such as one depicted figuratively in FIG. 9, an inorganic component 902 having organic functionality, OF (for linking to an organic component) is generated from a coupling agent 902 containing the organic functionality OF Again, the organic functionality OF of the coupling agent is selected based on the organic-component precursor.

In embodiments in which the coupling agent is the inorganic component precursor, it is not necessary to include additional coupling agent to graft the coupling agent-based inorganic component to the organic component since the organic functional group from the coupling agent is retained in the inorganic component formed therefrom.

In addition to morphological considerations, the relative concentrations of the inorganic and organic phases affect the physico-chemical properties of the hybrid IOC. As a first approximation to such concentrations, it can be assumed that inorganic and organic phases will contribute to hybrid IOC properties in proportion to their weight percentage in the hybrid IOC. Having an estimate of the properties expected for each phase, and those desired for the hybrid IOC, the concentration of the phases can be estimated.

Typically, the inorganic component is present in the hybrid IOC in an amount in the range from about 1 to 70 weight percent based on the combined weight of the inorganic and the organic components. In some embodiments, the inorganic component is advantageously present in a concentration less than about 30 weight percent based on the combined weight of the inorganic and the organic component. Hybrid IOCs containing such relatively low percentages of the inorganic phase are relatively lighter in weight (due to lower density) than those containing higher percentages of the inorganic. Thus, the inorganic-component precursor is provided in an amount within the ranges stated above. The organic component is present in the hybrid IOC in an amount in the range from about 20 to 99 weight percent based on the combined weight of the inorganic and organic components.

The order in which various linking and reaction steps are carried out is substantially freely permutable. For example, in one embodiment, a formulation comprising an inorganic component precursor, an unlinked coupling agent, an organic-component precursor is prepared and then reactions are carried out substantially contemporaneously. In a second embodiment, the formulation comprises an inorganic component that has been first synthesized from the inorganic-component precursor, an unlinked coupling agent, and an organic component precursor, In a third embodiment, the inorganic component is linked to the coupling agent and then the organic-component precursor is added. In a fourth embodiment, the coupling agent is linked to the organic-component precursor before it is linked to the inorganic component. In a fifth embodiment, the coupling agent is itself the inorganic component precursor so that additional coupling agent is not required beyond that required for synthesizing the inorganic component.

In addition to directly controlling the morphology of the inorganic and organic phases, optional formulation additives, such as, without limitation, a viscosity modifier, can be added. Note that after the hybrid IOC is formed, additional thermal processing as may be required for materials used in conjunction with the hybrid IOC in a particular application, and may affect hybrid IOC morphology.

It is known that a serious drawback of the sol-gel methodology for "growing" the inorganic phase is drying shrinkage. Drying shrinkage occurs as cosolvents and reaction byproducts are removed from the sol-gel solution. Shrinkage can cause cracks the hybrid IOC. Such shrinkage can be avoided if all the initial components and byproducts can be incorporated directly into the polymer (organic phase). Thus, in some embodiments, a means for reducing drying shrinkage is added. Such means can be, for example, a polymerizable solvent. The polymerizable solvent is advantageously the organic-component precursor itself. Hydroxy-terminated monomers can be suitable for this purpose. See, Novak et al., "Simultaneous Interpenetrating Networks of Inorganic Glasses and Organic Polymers: New Routes into Nonshrinking Sol-Gel Derived Composites," Polym. Prep., v.31, pp. 698–99 (1990); Ellsworth et al., "Mutually Interpenetrating Inorganic-Organic Network: New Routes into Nonshrinking Sol-Gel Derived Composites," J. Am. Chem. Soc., v. 113, pp. 2756–58 (1991).

The order in which various linking and reaction steps are carried out is substantially freely permutable. For example, in one embodiment, a formulation comprising an inorganic component precursor, an unlinked coupling agent, an organic component precursor is prepared and then reactions are carried out substantially contemporaneously. In a second embodiment, the formulation comprises an inorganic component that has been synthesized from the inorganic component precursor, an unlinked coupling agent, and an organic component precursor. In a third embodiment, the inorganic component is linked to the coupling agent and then the organic component precursor is added. In a fourth embodiment, the coupling agent is linked to the organic component precursor before it is linked to the inorganic component. In a fifth embodiment, the coupling agent is itself the inorganic component precursor so that additional coupling agent is not required beyond that required for synthesizing the inorganic component.

Having estimated inorganic and organic phase concentrations, a hybrid IOC is formed from the selected components at the estimated concentrations. The physico-chemical properties of interest are measured. Using this baseline, a second estimate of feed concentrations can be obtained and the process may be repeated until the desired properties are obtained.

In accordance with an illustrative embodiment of the present invention, a library of modules, each module defining a composition and morphology for an inorganic or organic component for obtain a specific set of physico-chemical properties, is collected as hybrid IOCs are engineered in accordance with the present teachings. Presented with a new application for a hybrid IOC, modules can be suitably selected from the library, as a function of the desired physico-chemical properties, to synthesize a hybrid IOC appropriate for the application.

In the following example, illustrative method 300 is applied to engineer hybrid IOCs for use as an alternative to conventional glass. Hybrid IOCs engineered for glass replacement call be used in a variety of applications, including, for example, in flat panel displays. Using such glass-replacement hybrid IOCs is desirable for a variety of reasons. In particular, while glass is disadvantageously formed at very high temperatures, is not particularly impact resistant and is not moldable, the hybrid IOCs are formed at low temperatures, are substantially impact resistant, and are moldable. And, like glass, such glass-replacement hybrid IOCs exhibit thermal, temporal and environmental (i.e., chemical) stability.

Utilizing illustrative method 300, first, the physico-chemical properties that the hybrid IOC must possess are defined (operation 302). For the present example, it is assumed that for the intended glass-replacement applications, transparency and freedom from birefringence are required, as well as the ability to maintain integrity up to about 400° C., and to have relatively high impact resistance and lower density than glass. Having defined the desired properties, candidate inorganic and organic components are identified that can contribute such properties to a hybrid IOC (operation 304).

The inorganic component is expected to impart the desired thermal properties to the hybrid. As such, a silicate, known for thermal resistance, is chosen. The silicate is advantageously formed from a precursor, such as, for example, tetraethyl orthosilicate (TEOS), tetramethyl orthosilicate (TMOS) or sodium metasilicate, the latter being inexpensive and readily commercially available. Forming the silicate from a precursor is desirable because it provides a far greater ability to control inorganic-phase morphology, as per later steps in the illustrative method.

The low density and high impact resistance required for the glass-replacement hybrid IOC is imparted by the organic component. Many polymers will possess those properties and, as a practical matter, such properties do not significantly limit the choice of organic component. The organic component also largely controls the extent to which the resulting hybrid IOC is transparent and free from birefringence. Choosing an organic component suitable for imparting such properties does limit the universe of acceptable organic components. Moreover, while the concentration of the inorganic component in the resulting hybrid IOC controls thermal stability, to the extent that the organic component possesses a relatively greater measure of thermal stability, a relatively lesser amount of the inorganic component is required to attain such stability. Reducing the amount of the inorganic component in the resulting hybrid IOC is generally desirable. In particular, as the relative concentration of the inorganic component in the resulting hybrid IOC increases, the likelihood of particle agglomeration increases. Such agglomeration tends to disadvantageously decrease impact resistance and deleteriously affect optical properties of the hybrid IOC.

Requiring a relatively high level of thermal stability further limits the choice of suitable organic compounds. Generally polymers containing aromatic rings and non-aromatic rings in their "main" chain provide relatively high thermal stability. Thus, polyimidosulfides; aromatic polyimides; poly(Bismaleimide)s; polysulfones and the like are advantageously selected as the organic component. It is within the capabilities of those skilled in the art to select precursors or monomers for forming such polymers. For a specific application, other polymers not having rings may provide suitable thermal stability.

Having selected candidate inorganic and organic compounds, consideration is given to the morphology of the inorganic and organic phases (operation 306). As previously described, inorganic-phase morphology can be controlled to influence thermal and mechanical properties. In particular, for the present example, it is desirable to provide an inorganic phase having a relatively larger proportion of $Q^2$ and $Q^3$, and a relatively smaller portion of $Q^4$. As previously described, the relatively larger proportion Of $Q^2/Q^3$ results in an inorganic phase having a relatively more diffuse morphology, thereby resulting in a relatively, high degree of inorganic/organic phase intermixing and thus a relatively high onset temperature for thermal decomposition in the resultant hybrid IOC. Moreover, a relatively more porous inorganic particle produces a hybrid IOC having a generally higher modulus and higher impact strength than less porous inorganic particles. To generate an inorganic phase having a morphology biased towards $Q^2/Q^3$, the inorganic particle-forming reaction is advantageously carried out in an acidic environment (e.g., 3.6 M hydrochloric acid, etc.)

Furthermore, since optical properties of the hybrid IOC are important, inorganic particle size is advantageously controlled. In particular, average inorganic particle diameter should be less than about 400 nm to substantially prevent the scattering of visible light. FIG. 8, which depicts a plot of inorganic particle amperage radius as a function of reaction time for the growth of poly(silicic acid) from sodium metasilicate, indicates that limiting average particle diameter to less than about 400 nm is readily achieveable.

Regarding organic-phase morphology, it is desirable for the organic component to be amorphous or non crystalline, and not bifringent. As such, the organic component (i.e., polymer) should be "non-oriented" in the sense that the polymer should not adopt a preferred chain or orientation. Moreover, the organic component should have a relatively high glass-transistion temperature. More particularly, the glass-transition temperature should be at least about 20°–30° C. above the use temperature of the hybrid IOC. A glass-transition temperature of about of 100° C. or more will suffice for many applications. Furthermore, it is desirable for the organic phase to be cross-linked, which may be accomplished via the addition of a crosslinker, as is knows in the art. Note that organic-phase morphology is primarily dependent upon the selected organic component. A far greater ability exists to control inorganic-phase morphology via processing conditions, etc.

The morphology of the hybrid IOC is substantially controlled by the coupling agent that links the inorganic and organic phases (operation 308). As previously described, the coupling agent is selected to form covalent bonds with functional groups in both the inorganic and organic components. Thus, coupling agent selection is controlled, in large part, by the specific inorganic and organic components comprising the hybrid IOC. For the present example, it is advantageous to use a bi-functional coupling agents, which, as previously described, act as a chain extender for the organic polymer. Relative to shorter-chained polymers, such longer-chained polymers typically result in a hybrid IOC biting greater mechanical robustness, less brittleness and greater impact strength, all of which are desirable attributes for a hybrid IOC useful as a glass replacement.

Additionally, in the present example, it is advantageous for the organic phase to be the "dominant phase," being present in a proportion greater than 50 volume percent based on the inorganic and organic phase precursors that form the hybrid IOC. In other words, the resulting hybrid IOC should be in the form of an organic matrix with the inorganic phase dispersed throughout.

After candidate inorganic and organic compounds are selected, and a route for their synthesis from appropriate precursors is determined, routine parametric testing is advantageously preformed wherein hybrid IOCs based on a given organic compound and various levels of a given inorganic are synthesized and appropriately analyzed to qualify the candidate components and optimize their concentrations in the hybrid IOC.

It is to be understood that the embodiments described herein are merely illustrative of the many possible specific arrangements that can be devised in application of the principles of the invention. Other arrangements can be devised in accordance with these principles by those of ordinary skill in the art without departing from the scope and spirit of the invention. It is therefore intended that such other arrangements be included within the scope of the following claims and their equivalents.

I claim:

1. A method for synthesizing hybrid inorganic/organic compounds (IOCs) from inorganic and organic components, comprising the steps of:
    defining the properties required for a hybrid IOC;
    selecting an inorganic component having a first morphology such that the inorganic component has at least a portion of the defined properties wherein:
        said first morphology is obtained by controlling formation of the inorganic component from an inorganic component precursor;
        said controlled formation comprises controlling a degree of condensation of the inorganic component so that said first morphology is one of either:
            diffuse, by controlling said degree of condensation to a relatively larger proportion of $Q^2$ and $Q^3$ and a relatively smaller proportion of $Q^4$; or
            dense, by controlling to said degree of condensation to a relatively larger proportion of $Q^4$ than $Q^2$; and
    selecting an organic component having a second morphology such that the organic component has at least a portion of the defined properties wherein:
        said second morphology is obtained by controlling the formation of the organic component from an organic component precursor.

2. The method of claim 1 wherein said first morphology of the inorganic component is controlled by forming the inorganic component from a precursor comprising a modified-metal alkoxide.

3. The method of claim 2, wherein the modified-metal alkoxide is fluorine substituted.

4. The method of claim 1 wherein said first morphology of the inorganic component is further controlled by controlling average particle size of the inorganic component during formation thereof.

5. The method of claim 4, wherein the average particle size of the inorganic component is controlled by determining a relationship between average particle size and reaction time, and terminating the formation reaction at a time determined to yield the desired average particle size.

6. The method of claim 5, wherein the average particle size is less than or equal to about 400 nanometers so that the hybrid IOC is transparent.

7. The method of claim 1 further comprising:
    providing a first quantity of the inorganic component;
    providing a second quantity of the organic component; and
    linking the first quantity of the inorganic component and the second quantity of organic component such that, when linked, the hybrid IOC possessing the defined properties is obtained;
        wherein said first quantity is in the range of about 1 to 70 weight percent and said second quantity is in the range of about 20 to 99 weight percent based on the sum of said first and said second quantities.

8. The method of claim 7, wherein, in the step of forming the hybrid IOC, the inorganic and organic components are linked by a coupling agent.

9. The method of claim 8, wherein the coupling agent is bifunctional.

10. The method of claim 1 wherein the inorganic component is formed in an acidic environment to control condensation to a relatively larger proportion of $Q^2$ and $Q^3$ and a relatively smaller proportion of $Q^4$.

11. The method of claim 1, wherein the second morphology of the organic component is controlled by forming the organic component from a block copolymer.

12. The method of claim 1, wherein the second morphology of the organic component is controlled by forming the organic component using a cross-linker.

13. The method of claim 1, wherein the hybrid IOC is used is for glass replacement, and the step of selecting further comprises selecting an organic component that includes at least one cyclic moiety.

14. The method of claim 13, wherein the morphology of the inorganic component is controlled to provide an inorganic component that has an average particle diameter less than or equal to about 400 nm.

15. The method of claim 13, wherein, in the step of forming the hybrid IOC, the inorganic and organic components are linked by a bifunctional coupling agent.

16. The method of claim 15, wherein the step forming the inorganic component further comprises forming the inorganic component in an acidic solution.

17. The method of claim 15, wherein the step of forming the inorganic component comprises selecting the inorganic component from the group consisting of polyimidosulfides and aromatic polyimides.

18. A method for making a hybrid inorganic-organic compound suitable for use as a replacement for conventional glass, comprising:
    combining (i) about 1–70 weight percent on a dry basis of an inorganic component precursor suitable for forming an inorganic component, wherein the inorganic component is formed such that it comprises a suspension of particles having an average diameter of less than about 400 nm and a relatively higher proportion of $Q^2$ and $Q^3$ structure, and a relatively smaller portion of $Q^4$ structure;
        (ii) about 1–70 weight percent of a coupling agent having at least a first and a second functional group; and
        (iii) about 20–98 weight of an organic component precursor that forms an organic component having a predetermined amount of transparency and freedom from birefringence and having a glass transition temperature above about 100° C.
    forming the inorganic component; and
    forming the organic component; wherein, the first functional group of the coupling agent is selected for its ability to chemically bond with a functional group present in the inorganic precursor and the inorganic component, and the second functional group of the coupling agent is selected for its ability to bond with a functional group present in the organic component precursor and the organic component.

19. A method for synthesizing hybrid inorganic/organic compounds (IOCs) from inorganic and organic components, comprising the steps of:

defining the properties required for a hybrid IOC;

selecting an inorganic component having a first morphology such that the inorganic component has at least a portion of the defined properties wherein:

said first morphology is obtained by controlling formation of the inorganic component from an inorganic component precursor; and said controlled formation comprises controlling a degree of condensation of the inorganic component by controlling pH to an acidic range during said formation of said inorganic component; and selecting an organic component having a second morphology such that the organic component has at least a portion of the defined properties wherein:

said second morphology is obtained by controlling the formation of the organic component from an organic component precursor.

20. A method for synthesizing hybrid inorganic/organic compounds (IOCs) from inorganic and organic components, comprising the steps of:

defining the properties required for a hybrid IOC;

selecting an inorganic component having a first morphology such that the inorganic component has at least a portion of the defined properties wherein:

said first morphology is obtained by controlling formation of the inorganic component from an inorganic component precursor; and said controlled formation comprises controlling a degree of condensation of the inorganic component by controlling pH to a basic range during said formation of said inorganic component; and selecting an organic component having a second morphology such that the organic component has at least a portion of the defined properties wherein:

said second morphology is obtained by controlling the formation of the organic component from an organic component precursor.

* * * * *